United States Patent
Yamada et al.

(10) Patent No.: US 10,577,498 B2
(45) Date of Patent: Mar. 3, 2020

(54) POLYBUTYLENE TEREPHTHALATE RESIN COMPOSITION

(71) Applicant: Polyplastics Co., Ltd., Tokyo (JP)

(72) Inventors: Shinya Yamada, Fuji (JP); Kazuya Goshima, Fuji (JP)

(73) Assignee: POLYPLASTICS CO., LTD., Tokyo (JP)

( * ) Notice: Subject to any disclaimer, the term of this patent is extended or adjusted under 35 U.S.C. 154(b) by 0 days.

(21) Appl. No.: 15/779,064

(22) PCT Filed: Nov. 30, 2016

(86) PCT No.: PCT/JP2016/085574
§ 371 (c)(1),
(2) Date: May 24, 2018

(87) PCT Pub. No.: WO2017/094781
PCT Pub. Date: Jun. 8, 2017

(65) Prior Publication Data
US 2018/0346712 A1 Dec. 6, 2018

(30) Foreign Application Priority Data
Nov. 30, 2015 (JP) ................. 2015-233255

(51) Int. Cl.
C08L 67/02 (2006.01)
C08K 5/103 (2006.01)
C08G 63/183 (2006.01)
C08J 5/04 (2006.01)

(52) U.S. Cl.
CPC ............ C08L 67/02 (2013.01); C08K 5/103 (2013.01); C08G 63/183 (2013.01); C08J 5/04 (2013.01); C08K 2201/014 (2013.01)

(58) Field of Classification Search
CPC ................. C08L 67/02; C08K 5/103
See application file for complete search history.

(56) References Cited

U.S. PATENT DOCUMENTS

2006/0291215 A1* 12/2006 Shirai ................ B29C 45/0001
362/341
2007/0299168 A1 12/2007 Ariki et al.
2010/0209646 A1 8/2010 Yamada
2013/0184346 A1 7/2013 Saito et al.

FOREIGN PATENT DOCUMENTS

| EP | 0552546 A1 | 7/1993 |
| EP | 2 177 567 A1 * | 4/2010 |
| EP | 2177567 A1 | 4/2010 |
| JP | H05-179114 A | 7/1993 |
| JP | H09-176462 A | 7/1997 |
| JP | 2001-146547 A | 5/2001 |
| JP | 2005-097563 A | 4/2005 |
| JP | 2006-154783 A | 6/2006 |
| JP | 2013-237776 A | 11/2013 |
| JP | 2014-182272 A | 9/2014 |
| WO | WO 2009/050859 A1 | 4/2009 |
| WO | WO 2012/036145 A1 | 3/2012 |

OTHER PUBLICATIONS

Notification of Reasons for Refusal issued in connection with Japanese Patent Application No. 2015-233255 dated Dec. 19, 2017.
Notification of Reasons for Refusal issued in connection with Japanese Patent Application No. 2015-233255 dated Jan. 23, 2018.
Extended European Search Report issued in European Patent Application No. EP16870718.0 dated May 16, 2019.

* cited by examiner

Primary Examiner — Robert D Harlan
(74) Attorney, Agent, or Firm — Knobbe, Martens, Olson & Bear LLP

(57) ABSTRACT

Provided is a polybutylene terephthalate resin composition which has further improved fluidity (melt fluidity) while maintaining mechanical characteristics. The polybutylene terephthalate resin composition contains 0.05-5 parts by mass of a glycerin fatty acid ester having a hydroxyl value of 200-400, and 0.05-5 parts by mass of a polyvalent alcohol fatty acid ester having a hydroxyl value of 100 or less, with respect to 100 parts by mass of a polybutylene terephthalate resin. The glycerin fatty acid ester preferably contains glycerin and/or a dehydration condensation product thereof, and a fatty acid having 12 or more carbon atoms.

3 Claims, No Drawings

POLYBUTYLENE TEREPHTHALATE RESIN COMPOSITION

TECHNICAL FIELD

The present invention relates a polybutylene terephthalate resin composition having excellent fluidity.

BACKGROUND ART

Polybutylene terephthalate resins, which have excellent mechanical properties, electrical properties, thermal resistance, weather resistance, water resistance, chemical resistance, and solvent resistance, are widely used as engineering plastics for various uses such as automotive parts and electrical/electronic components.

Increasingly popular molded articles made of polybutylene terephthalate resins include thin platelike or thin-walled boxlike molded articles, for example, microswitch housings, small coil bobbins, thin connectors, and disk cartridge shutters, and the like; or intricately shaped molded articles. The molding of such a molded article with a resin having low fluidity is difficult due to molding defects likely resulting from insufficient filling of a mold for the molded article. In particular, an inorganic bulking agent such as, for example, glass fiber is often blended with a resin composition in order to improve mechanical properties depending on the field where it is used. However, such a resin composition has much lower fluidity, resulting in problems such as the development of warpage due to uneven flow of the resin in addition to probable molding defects. Therefore, a polybutylene terephthalate resin having improved fluidity has been desired.

As a method of improving the fluidity of a polybutylene terephthalate resin, Patent Document 1, for example, discloses a method including: blending polybutylene terephthalate species having different viscosities (number average molecular weights) in a predetermined proportion. Patent Document 1 also describes that a polybutylene terephthalate resin composition obtained in this way can improve the repeated-fatigue resistance of the resulting molded article, and also has high fluidity in the molten state. Nonetheless, even the above polybutylene terephthalate resin composition has an inferior resin extensibility and the like as compared with a case where highly viscous polybutylene terephthalate is used alone.

Further, Patent Document 2 discloses a method of improving fluidity while preventing leakage, the method including: blending a specific glycerin fatty acid ester with a polybutylene terephthalate resin. Specifically, a predetermined amount of a glycerin fatty acid ester having a hydroxyl value of 200 or more is blended as the specific glycerin fatty acid ester. This can improve fluidity while maintaining mechanical strength without causing problems such as metal contamination.

However, a molded article having a smaller, thinner, and also more complex shape with various functions has been demanded. In view of the above, a polybutylene terephthalate resin composition for producing these molded articles has been desired which has even further improved fluidity without impairing the properties of these molded articles.

Patent Document 1: Japanese Unexamined Patent Application, Publication No. H05-179114
Patent Document 2: PCT International Publication No. WO2009/050859

SUMMARY OF THE INVENTION

Problems to be Solved by the Invention

The present invention is made in view of the above actual circumstances. An object of the present invention is to provide a polybutylene terephthalate resin composition having further improved fluidity (melt fluidity) while maintaining mechanical properties.

Means for Solving the Problems

After conducting extensive studies to achieve the above objective, the present investors found that the combined blending of a high-hydroxyl-value ester having a high hydroxyl value and a low-hydroxyl-value ester having a low hydroxyl value in a polybutylene terephthalate resin as a base resin can improve fluidity as compared with that of a conventional material while maintaining the mechanical properties of the polybutylene terephthalate resin. The present invention was then completed. That is, the present invention can provide the following.

(1) A first embodiment of the present invention is a polybutylene terephthalate resin composition including: 0.05 to 5 parts by mass of a glycerin fatty acid ester having a hydroxyl value of 200 or more to 400 or less and 0.05 to 5 parts by mass of a polyhydric alcohol fatty acid ester having a hydroxyl value of 100 or less relative to 100 parts by mass of a polybutylene terephthalate resin.

(2) A second embodiment of the present invention is the polybutylene terephthalate resin composition according to the first embodiment, in which the glycerin fatty acid ester includes glycerin and/or a dehydration-condensation product thereof and a fatty acid having 12 or more carbon atoms.

(3) A third embodiment of the present invention is the polybutylene terephthalate resin composition according to the first or second embodiment, in which the polybutylene terephthalate resin has an intrinsic viscosity of 0.65 to 1.30 dl/g.

Effects of the Invention

The polybutylene terephthalate resin composition according to an embodiment of the present invention can improve fluidity while maintaining the mechanical properties thereof.

DETAILED DESCRIPTION OF THE PREFERRED EMBODIMENT

Below, the specific embodiments of the present invention will be described in detail. It is noted that the present invention shall not be limited to the following embodiments, and modifications may be made without departing from the scope and spirit of the present invention. Further, the term "X to Y" (wherein X and Y are any numerical values) as used herein means "X or more to Y or less."

1. Polybutylene Terephthalate Resin Composition

The polybutylene terephthalate resin composition (hereinafter may simply be referred to as the "resin composition") according to an embodiment of the present invention includes a polybutylene terephthalate resin as a base resin in which a glycerin fatty acid ester having a high hydroxyl value and a polyhydric alcohol fatty acid ester having a low hydroxyl value are blended. Specifically, the glycerin fatty acid ester is an ester having a hydroxyl value of 200 or more to 400 or less, and the polyhydric alcohol fatty acid ester is an ester having a hydroxyl value of 100 or less.

As described above, in the polybutylene terephthalate resin composition according to an embodiment of the present invention, an ester having a high hydroxyl value and an ester having a low hydroxyl value are both blended with a polybutylene terephthalate resin. This can improve fluidity when melted while maintaining the desired properties such as the mechanical properties of that resin, and also prevent the development of defective flow and defective filling within a mold for molding.

(A) Polybutylene Terephthalate Resin

A polybutylene terephthalate resin serving as a base resin of the polybutylene terephthalate resin composition according to an embodiment of the present invention is a thermoplastic resin including at least the following polymerizable components: terephthalic acid (terephthalic acid or an esterified derivative thereof) and alkylene glycol (1,4-butanediol) having 4 carbon atoms or an esterified derivative thereof.

Specific examples of the above polybutylene terephthalate resin (PET resin) include, for example: a homopolyester (polybutylene terephthalate) composed of a repeating unit derived from butylene terephthalate; a copolyester (butylene terephthalate copolymer or polybutylene terephthalate copolyester) composed of a repeating unit derived from butylene terephthalate as the main component and a repeating unit(s) derived from a copolymerizable monomer(s) in the ratio as described below; or the like.

Examples of the copolymerizable monomer(s) in the copolyester (butylene terephthalate copolymer or denatured PBT resin) (hereinafter may simply be referred to as the "copolymerizable monomer") include dicarboxylic acid components apart from terephthalic acid, diols apart from 1,4-butanediol, oxycarboxylic acid components, lactone components, and the like. The copolymerizable monomer(s) may be used alone or in combinations of two or more.

Examples of dicarboxylic acid (or a dicarboxylic acid component or dicarboxylic acids) include aliphatic dicarboxylic acid (for example, $C_{4-40}$ dicarboxylic acid, preferably $C_{4-14}$ dicarboxylic acid such as succinic acid, glutaric acid, adipic acid, pimelic acid, suberic acid, azelaic acid, sebacic acid, undecanedicarboxylic acid, dodecanedicarboxylic acid, hexadecanedicarboxylic acid, and dimer acid); alicyclic dicarboxylic acid components (for example, $C_{8-12}$ dicarboxylic acid such as hexahydrophthalic acid, hexahydroisophthalic acid, hexahydroterephthalic acid, and himic acid); aromatic dicarboxylic acid components apart from terephthalic acid (for example, naphthalenedicarboxylic acid such as phthalic acid, isophthalic acid, 2,6-naphthalenedicarboxylic acid; $C_{8-16}$ dicarboxylic acid such as 4,4'-diphenyldicarboxylic acid, 4,4'-diphenoxyetherdicarboxylic acid, 4,4'-diphenyletherdicarboxylic acid, 4,4'-diphenylmethanedicarboxylic acid, and 4,4'-diphenylketonedicarboxylic acid); reactive derivatives thereof (for example, esterifiable derivatives such as lower alkyl ester ($C_{1-4}$ alkyl ester of phthalic acid or isophthalic acid such as dimethylphthalic acid and dimethylisophthalic acid (DMI); and the like), acid chloride, and acid anhydride); and the like. Further, polyhydric carboxylic acid such as trimellitic acid and pyromellitic acid or an esterified derivative thereof (alcohol ester and the like) may be used together, if desired. Further, combined use of such a polyfunctional compound can also provide a branched polybutylene terephthalate resin.

Examples of diol (or diol components or diols) include, for example, aliphatic alkanediols apart from 1,4-butanediol [for example, alkanediol (for example, lower alkanediol such as ethylene glycol, trimethylene glycol, propylene glycol, neopentylglycol, hexanediol (1,6-hexanediol and the like), octanediol (1,3-octanediol, 1,8-octanediol, and the like), preferably linear or branched $C_{2-12}$ alkanediol, more preferably linear or branched $C_{2-10}$ alkanediol, and the like); (poly)oxyalkylene glycol (For example, glycol having two or more oxy $C_{2-4}$ alkylene units, for example, diethylene glycol, dipropylene glycol, ditetramethylene glycol, triethylene glycol, tripropylene glycol, polytetramethylene glycol, and the like); and the like], alicyclic diol (for example, 1,4-cyclohexanediol, 1,4-cyclohexanedimethanol, hydrogenated bisphenol A, and the like), aromatic diol [for example, dihydroxyl $C_{6-14}$ arene such as hydroquinone, resorcinol, and naphthalenediol; biphenol (4,4'-dihydroxylbiphenyl and the like); bisphenols; xylylene glycol; and the like], reactive derivatives thereof (for example, esterifiable derivatives such as alkyl, alkoxy, or halogen substitution products), and the like. Further, polyols such as glycerin, trimethylolpropane, trimethylolethane, and pentaerythritol; or esterifiable derivatives thereof may be used together, if desired. Moreover, combined use of such a polyfunctional compound can also provide a branched polybutylene terephthalate resin.

Bisphenols include bis(hydroxyaryl)$C_{1-6}$ alkane such as bis(4-hydroxyphenyl)methane (bisphenol F), 1,1-bis(4-hydroxyphenyl)ethane (bisphenol AD), 1,1-bis(4-hydroxyphenyl)propane, 2,2-bis(4-hydroxyphenyl)propane (bisphenol A), 2,2-bis(4-hydroxy-3-methylphenyl)propane, 2,2-bis(4-hydroxyphenyl)butane, 2,2-bis(4-hydroxyphenyl)-3-methylbutane, 2,2-bis(4-hydroxyphenyl)hexane, and 2,2-bis(4-hydroxyphenyl)-4-methylpentane; bis(hydroxyaryl)$C_{4-10}$ cycloalkane such as 1,1-bis(4-hydroxyphenyl)cyclopentane and 1,1-bis(4-hydroxyphenyl)cyclohexane; 4,4'-dihydroxydiphenyl ether; 4,4'-dihydroxydiphenyl sulfone; 4,4'-dihydroxydiphenyl sulfide; 4,4'-dihydroxydiphenyl ketone; and alkylene oxide adducts thereof. Alkylene oxide adducts include $C_{2-3}$ alkylene oxide adducts of bisphenols (for example, bisphenol A, bisphenol AD, and bisphenol F), for example, 2,2-bis[4-(2-hydroxyethoxy)phenyl]propane, diethoxylated bisphenol A (EBPA), 2,2-bis[4-(2-hydroxypropoxy)phenyl]propane, dipropoxylated bisphenol A, and the like. The number of moles of added alkylene oxide ($C_{2-3}$ alkylene oxide such as ethylene oxide and propylene oxide) is, for example, 1 to 10 moles for each hydroxyl group, preferably about 1 to 5 moles.

Examples of oxycarboxylic acid (or oxycarboxylic acid components or oxycarboxylic acids) include, for example, oxycarboxylic acid such as hydroxybenzoic acid, oxynaphthoic acid, hydroxyphenyl acetic acid, glycolic acid, and oxycaproic acid or derivatives thereof; and the like. Examples of lactone include $C_{3-12}$ lactone such as propiolactone, butyrolactone, valerolactone, and caprolactone (for example, ε-caprolactone and the like); and the like.

Among these copolymerizable monomers, preferably used are diols [$C_{2-6}$ alkylene glycol (linear or branched alkylene glycol such as ethylene glycol, trimethylene glycol, propylene glycol, and hexanediol; and the like), polyoxy $C_{2-4}$ alkylene glycol having about 2 to 4 repeating oxyalkylene units (diethylene glycol and the like), bisphenols (bisphenols, alkylene oxide adducts thereof, or the like)]; dicarboxylic acids [$C_{6-12}$ aliphatic dicarboxylic acid (adipic acid, pimelic acid, suberic acid, azelaic acid, sebacic acid, and the like), asymmetrical aromatic dicarboxylic acid in which a carboxyl group is substituted at an asymmetrical position on the arene ring, 1,4-cyclohexane dimethanol, and the like]; and the like.

In particular, a homopolyester (polybutylene terephthalate) and/or a copolymer (polybutylene terephthalate copolyester) are preferred as the polybutylene terephthalate resin. Further, the polybutylene terephthalate resin may be a copolyester having a copolymerizable monomer percentage (the degree of denaturalization) of, usually, 45 mol % or less (for example, about 0 mol % or more to 45 mol % or less), preferably 35 mol % or less (for example, about 0 mol % or more to 35 mol % or less), more preferably 30 mol % or less (for example, about 0 mol % or more to 30 mol % or less).

It is noted that the copolymerizable monomer percentage in a copolymer may be selected, for example, from the range of about 0.01 mol % or more to 30 mol % or less, usually 1 mol % or more to 30 mol % or less, preferably about 3 mol % or more to 25 mol % or less, more preferably about 5 mol % or more to 20 mol % or less. Further, when a homopolyester (polybutylene terephthalate) and a copolymer (copolyester) are used in combination, the ratio of the homopolyester and the copolyester are in a range so that the percentage of a copolymerizable monomer is 0.1 mol % or more to 30 mol % or less relative to the entire monomers (preferably, about 1 mol % or more to 25 mol % or less, more preferably about 5 mol % or more to 25 mol % or less), and may be usually selected from the range of former/latter=99/1 to 1/99 (mass ratio), preferably 95/5 to 5/95 (mass ratio), more preferably 90/10 to 10/90 (weight ratio).

Moreover, the polybutylene terephthalate resin preferably has a terminal-carboxyl group content of 30 meq/kg or less, more preferably 25 meq/kg or less. Here, the terminal-carboxyl group content may be measured, for example, as follows. That is, a sample of grounded polybutylene terephthalate may be dissolved in benzyl alcohol under a temperature condition of 215° C. for 10 minutes, and then titrated with 0.01 N aqueous sodium hydroxide to determine the content.

A polybutylene terephthalate resin having a terminal-carboxyl group content of 30 meq/kg or less as described above can improve the hydrolysis resistance of the resulting polybutylene terephthalate resin composition. It is noted that there is no particular limitation on the lower limit of the terminal-carboxyl group content, but it is preferably 5 meq/kg or more, more preferably 10 meq/kg or more because manufacture is generally difficult when it is less than 5 meq/kg.

The polybutylene terephthalate resin preferably has an intrinsic viscosity (IV) of 1.30 dl/g or less, more preferably 1.2 dl/g or less. An intrinsic viscosity of more than 1.30 dl/g cannot sufficiently provide the effect of improving the fluidity of a resin composition, resulting in defective flow, filling, and the like of the resin within a mold for molding. On the other hand, there is no particular limitation on the lower limit of the intrinsic viscosity, but it is preferably 0.6 dL/g or more, more preferably 0.7 dL/g or more.

It is noted that the intrinsic viscosity may be adjusted to the aforementioned suitable ranges by blending polybutylene terephthalate resins having different intrinsic viscosities. Further, this intrinsic viscosity (IV) can be measured in o-chlorophenol under a temperature condition of 35° C.

A commercially available polybutylene terephthalate resin may be used. Alternatively, a product may be used obtainable from copolymerization (polycondensation) of terephthalic acid or a reactive derivative thereof, 1,4-butanediol, and, if desired, a copolymerizable monomer according to the conventional method, for example, according to the transesterification method, the direct esterification method, or the like.

(B) Glycerin Fatty Acid Ester

In the polybutylene terephthalate resin composition according to an embodiment of the present invention, a glycerin fatty acid ester having a hydroxyl value of 200 or more to 400 or less is blended with a polybutylene terephthalate resin as a base resin as desired above. The glycerin fatty acid ester is, for example, an ester composed of glycerin and/or a dehydration-condensation product thereof and a fatty acid having 12 or more carbon atoms.

The inclusion of a glycerin fatty acid ester having a hydroxyl value of 200 or more to 400 or less in the polybutylene terephthalate resin composition according to an embodiment of the present invention as described above can efficiently improve the fluidity of the resin composition when melted while maintaining superior properties such as the mechanical strength and toughness intrinsic to a polybutylene terephthalate resin. Further, the fluidity of this resin composition can be further improved as compared with that of a conventional material when the above glycerin fatty acid ester is used in combination with the polyhydric alcohol fatty acid ester having a low hydroxyl value described below. It is noted that the above glycerin fatty acid ester polyhydric hydroxyl group-containing compound having a hydroxyl value of 200 or more to 400 or less may also be referred to as the "high-hydroxyl-value ester."

The glycerin fatty acid ester is a compound having two or more hydroxyl groups in one molecule, and has a hydroxyl value of 200 or more, more preferably 220 or more, and even more preferably 250 or more as described above. A hydroxyl value of 200 or more can further enhance the effect of improving the fluidity of a resin composition. On the other hand, when the hydroxyl value of the glycerin fatty acid ester is too large, a reaction with a polybutylene terephthalate resin may be excessively promoted, and as a result, properties such as mechanical properties, thermal resistance, and chemical resistance may be deteriorated due to decreased molecular weight of the polybutylene terephthalate resin. Therefore, in order to effectively improve fluidity while maintaining the mechanical properties and the like of a polybutylene terephthalate resin, a glycerin fatty acid ester having a hydroxyl value of 400 or less, more preferably 350 or less, and even more preferably 300 or less is used.

The content of a glycerin fatty acid ester in a polybutylene terephthalate resin composition is 0.05 parts by mass or more to 5 parts by mass or less relative to 100 parts by mass of a polybutylene terephthalate resin. Further, the content is preferably 0.1 parts by mass or more to 3 parts by mass or less, more preferably 0.5 parts by mass or more to 2 parts by mass or less. A content of a glycerin fatty acid ester of 0.05 parts by mass or more is preferred because the effect of improving fluidity tends to be sufficiently obtained. On the other hand, a content of 5 parts by mass or less is preferred because risks of poor appearance of a molded article due to development of gas upon molding and mold staining are mostly eliminated.

Here, the glycerin fatty acid ester is composed of glycerin and/or a dehydration-condensation product thereof and a fatty acid having 12 carbon atoms or more as described above. In view of the above, among glycerin fatty acid esters, those obtainable from a fatty acid having 12 carbon atoms or more are preferred. Examples of the fatty acid having 12 carbon atoms or more include lauric acid, oleic acid, palmitic acid, stearic acid, 12-hydroxystearic acid, behenic acid, montanoic acid, and the like. Further, as the above fatty acid, those having 12 or more to 32 or fewer carbon atoms are more preferred, and those having 12 or more to 22 or fewer carbon atoms are particularly preferred. Specifically, any of lauric acid, stearic acid, 12-hydroxystearic acid, or behenic acid may in particular be preferably used.

Use of a fatty acid having 12 or more carbon atoms as a fatty acid in the glycerin fatty acid ester as described above is preferred because the mechanical properties, such as elasticity, and thermal resistance of a polybutylene terephthalate resin can be sufficiently maintained. Moreover, use of a fatty acid having 32 or fewer carbon atoms can particularly enhance the effect of improving fluidity when melted.

Specifically, preferred glycerin fatty acid esters include, for example, glycerin monostearate, glycerin monobehenate, diglycerin monostearate, triglycerin monostearate, triglycerin stearic acid partial ester, tetraglycerin stearic acid partial ester, decaglycerin lauric acid partial ester, glycerin mono-12-hydroxystearate, and the like.

It is noted that glycerin fatty acid esters may be manufactured by a publicly known method for use in the present invention, or commercial products may be purchased for use in the present invention.

(C) Polyhydric Alcohol Fatty Acid Ester

In the polybutylene terephthalate resin composition according to an embodiment of the present invention, a polyhydric alcohol fatty acid ester having a hydroxyl value of 100 or less is blended with a polybutylene terephthalate resin as a base resin. The above polyhydric alcohol fatty acid ester is an ester composed of polyhydric alcohol such as ethylene glycol, glycerin, 1,2,4-butanetriol, diglycerin, pentaerythritol, sorbitol, erythritol, and hexanetriol; and a fatty acid having 10 to 35 carbon atoms.

In the polybutylene terephthalate resin composition according to an embodiment of the present invention, combined use of the aforementioned glycerin fatty acid ester having a hydroxyl value of 200 or more to 400 or less and the aforementioned polyhydric alcohol fatty acid ester having a hydroxyl value of 100 or less can further improve the fluidity of a resin composition when melted as compared with that of a conventional material. It is noted that the above polyhydric alcohol fatty acid ester having a hydroxyl value of 100 or less may be referred to as the "low-hydroxyl-value ester" with regard to the relationship with the glycerin fatty acid ester polyhydric hydroxyl group-containing compound as a high-hydroxyl-value ester.

The polyhydric alcohol fatty acid ester has a hydroxyl value of 100 or less as described above, more preferably 80 or less, and even more preferably 50 or less. Combined blending of the above polyhydric alcohol fatty acid ester having a hydroxyl value of 100 or less and a glycerin fatty acid ester as a high-hydroxyl-value ester can further enhance the effect of improving the fluidity of a resin composition.

The content of a polyhydric alcohol fatty acid ester in a polybutylene terephthalate resin composition is 0.05 parts by mass or more to 5 parts by mass or less relative to 100 parts by mass of a polybutylene terephthalate resin. Further, the content is preferably 0.1 parts by mass or more to 3 parts by mass or less, more preferably 0.5 parts by mass or more to 2 parts by mass or less. A content of a polyhydric alcohol fatty acid ester of 0.05 parts by mass or more is preferred because the effect of improving fluidity tends to be sufficiently obtained. On the other hand, a content of 5 parts by mass or less is preferred because risks of poor appearance of a molded article due to development of gas upon molding and mold staining are mostly eliminated.

Here, the polyhydric alcohol fatty acid ester is composed of a polyhydric alcohol and a fatty acid, for example, having 10 to 35 carbon atoms as described above. Among polyhydric alcohol fatty acid esters, preferred is an ester obtainable with a fatty acid preferably having 10 or more carbon atoms, more preferably 12 or more, and even more preferably 18 or more. Fatty acids having 10 or more carbon atoms include lauric acid, oleic acid, palmitic acid, stearic acid, 12-hydroxystearic acid, behenic acid, montanoic acid, and the like. Further, polyhydric alcohols include ethylene glycol, glycerin, 1,2,4-butanetriol, diglycerin, pentaerythritol, sorbitol, erythritol, hexanetriol, and the like.

Specifically, preferred polyhydric alcohol fatty acid esters include pentaerythritol tetrapalmitate, pentaerythritol tetrabehenate, pentaerythritol tetrastearate, hexaglycerin tetrabehenate tetrapalmitate, hexaglycerin octabehenate, pentaglycerin heptabehenate, tetraglycerin hexabehenate, triglycerin pentabehenate, diglycerin tetrabehenate, glycerin tribehenate, dipentaerythritol hexamyristate, dipentaerythritol hexapalmitate, and the like.

It is noted that polyhydric alcohol fatty acid esters may be manufactured by a publicly known method for use in the present invention, or commercial products may be purchased for use in the present invention.

Other Components (D) Inorganic Bulking Agent

An inorganic bulking agent may be blended in the polybutylene terephthalate resin composition according to an embodiment of the present invention. The inclusion of an inorganic bulking agent in a resin composition can enhance physical properties such as the mechanical strength of the resulting molded article.

In addition, for the polybutylene terephthalate resin composition according to an embodiment of the present invention, combined blending of a glycerin fatty acid ester having a hydroxyl value of 200 or more to 400 or less (high-hydroxyl-value ester) and a polyhydric alcohol fatty acid ester having a hydroxyl value of 100 or less (low-hydroxyl-value ester) in a polybutylene terephthalate resin can further improve fluidity when melted as compared with that of a conventional material while maintaining the mechanical properties of the polybutylene terephthalate resin. Even when an inorganic bulking agent is blended in the above composition, molding can be performed with excellent fluidity.

There is no particular limitation on the inorganic bulking agent, but any of fibrous bulking agents, granular bulking agents, and platelike bulking agents can be used.

Specifically, fibrous bulking agents include, for example, inorganic fibrous materials such as glass fiber, asbestos fiber, silica fiber, silica-alumina fiber, alumina fiber, zirconia fiber, boron nitride fiber, silicon nitride fiber, boron fiber, potassium titanate fiber, and even fibrous forms of metal such as stainless steel, aluminum, titanium, copper, and brass. Further, granular bulking agents include silica, quartz powder, glass beads, milled glass fiber, glass balloon, and glass powder; silicates such as calcium silicate, aluminum silicate, kaoline, talc, clay, diatom earth, and wollastonite; metal oxides such as iron oxide, titanium oxide, zinc oxide, antimony trioxide, and alumina; metal carbonates such as calcium carbonate and magnesium carbonate; metal sulfates such as calcium sulfate and barium sulfate; others such as ferrite, silicon carbide, silicon nitride, boron nitride, and various metal powders; and the like. Further, platelike bulking agents include mica, glass flakes, various metal foils, and the like.

It is noted that the type and usage amount of an inorganic bulking agent is preferably adjust in an appropriate manner depending on the types and the like of compounds contained in a mixture. For example, the usage amount of an inorganic bulking agent is to be about 10 parts by mass or more to 200 parts by mass or less relative to 100 parts by mass of a polybutylene terephthalate resin.

(E) Additional Components

The polybutylene terephthalate resin composition according to an embodiment of the present invention may contain conventionally known additives such as an additional resin, a reinforcement bulking agent, a flame retardant, an antioxidant, a heat-resistant stabilizer, an ultraviolet absorber, an antistatic agent, a coloring agent such as a dye and a pigment, a lubricant, a plasticizing agent, and a crystal nucleating agent as long as the effects of the present invention are not impaired. Moreover, a transesterification catalyst and/or a transesterification terminator may be preferably contained as an additional component.

Specifically, the inclusion of a transesterification catalyst can promote a reaction of a polybutylene terephthalate resin with a glycerin fatty acid ester and a polyhydric alcohol fatty acid ester. When the reaction of a polybutylene terephthalate resin as a base resin with a glycerin fatty acid ester and a polyhydric alcohol fatty acid ester is slow, and thus a prolonged time is required until the desired fluidity is reached, the inclusion of a transesterification catalyst in the resin composition enables the desired fluidity to be more quickly achieved.

There is no particular limitation on the transesterification catalyst, but, for example, a metal compound may be used as the transesterification catalyst. In particular, titanium compounds, tin compounds, and antimony compounds may suitably be used. As specific examples of titanium compounds, the following may be exemplified: inorganic titanium compounds such as titanium oxide; titanium alcoholate such as tetramethyl titanate, tetraisopropyl titanate, and tetrabutyl titanate; titanium phenolate such as tetraphenyl titanate; and the like. Further, specific examples of tin compounds include dibutyltin oxide, hexaethylditin oxide, didodecyltin oxide, triethyltin hydroxide, tributyltin acetate, dibutyltin diacetate, diphenyltin dilaurate, monobutyltin trichloride, methylstannone acid, ethylstannone acid, butylstannone acid, and the like. Moreover, antimony compounds include antimony trioxide and the like. In particular, tetrabutyl titanate, tributyltin acetate, and antimony trioxide are preferably used.

On the other hand, an excessively promoted transesterification reaction may result in decreased physical properties of a molded article obtained by molding the corresponding resin composition. Therefore, a transesterification terminator appropriately contained in the composition can adjust fluidity to a desired level without causing problems such as decreased physical properties.

A phosphorus compound can be preferably used as the transesterification terminator. There is no particular limitation on the type and amount of the phosphorus compound, but they may be appropriately selected depending on conditions such as the types of compounds contained in a composition according to an embodiment of the present invention. There is no specific limitation on the phosphorus compound. Examples include phosphine-based, phosphinite-based, phosphonite-based, phosphite-based, posphinous amide-based, posphonous diamide-based, phosphorus triamide-based, phosphoramidite-based, phosphorodiamidite-based, phosphine oxide-based, phosphinate-based, phosphonate-based, phosphate-based, phosphinic amide-based, phosphonodiamidate-based, phosphoramide-based, phosphoramidate-based, phosphorodiamidate-based, phosphine imide-based, and phosphine sulfide-based phosphorus compounds. Phosphorus compounds also include those forming salts with metals.

2. Properties of Polybutylene Terephthalate Resin Composition

As described above, the polybutylene terephthalate resin composition according to an embodiment of the present invention includes a combination of a high-hydroxyl-value ester and a low-hydroxyl-value ester blended in a polybutylene terephthalate resin as a base resin. Specifically, a glycerin fatty acid ester having a hydroxyl value of 200 or more to 400 or less is blended as a high-hydroxyl-value ester, and a polyhydric alcohol fatty acid ester having a hydroxyl value of 100 or less is blended as a low-hydroxyl-value ester.

The polybutylene terephthalate resin composition as described above can improve fluidity when melted while maintaining the mechanical properties, such as elasticity, of the polybutylene terephthalate resin, and can prevent defective molding due to insufficient filling of a mold for a molded article and the like upon molding.

Specifically, the fluidity of this polybutylene terephthalate resin composition corresponds to a melt viscosity of 210 Pa·s or less as measured in accordance with ISO11443 at a furnace temperature of 260° C. and a shear rate of 1000 $sec^{-1}$ with a capillary φ1 mm×20 mmL. Further, the melt viscosity is preferably 200 Pa·s or less, more preferably 195 Pa·s or less.

Moreover, with regard to the mechanical properties of this polybutylene terephthalate resin composition, the modulus of elasticity when bending in accordance with ISO178 is 2400 or more.

3. Method of Manufacturing Polybutylene Terephthalate Resin Composition

There is no particular limitation on the method of manufacturing a polybutylene terephthalate resin composition according to an embodiment of the present invention, but it can be manufactured by a publicly known method using publicly known equipment.

For example, components required for a resin composition may be mixed and kneaded with a single or twin screw extruder or a melt kneader of a different type to prepare moldable pellets. Multiple extruders or melt kneaders of different types may be used. All of the components may be simultaneously fed through a hopper, or some of the components may be fed through a side feeding inlet. Here, the cylinder temperature of an extruder is preferably set so that the resin temperature inside the extruder is, for example, 240 to 300° C., preferably 250 to 270° C.

It is noted that when manufacturing a composition, a glycerin fatty acid ester (B) and a polyhydric alcohol fatty acid ester (C) may be simultaneously added to a polybutylene terephthalate resin (A), or, for example, the glycerin fatty acid ester (B) may be first added and melt-kneaded, and the polyhydric alcohol fatty acid ester (C) may then be added.

EXAMPLES

Below, Examples of the present invention will be described in a specific manner, but the present invention shall not be limited to the following Examples in any sense.

Material
(A) Polybutylene Terephthalate Resin
A-1: Polybutylene terephthalate resin (intrinsic viscosity=0.68 dL/g, terminal-carboxyl group content=27 meq/Kg, WinTech Polymer Ltd.)
(B) High-Hydroxyl-Value Ester
B-1: Triglycerin stearic acid partial ester (hydroxyl value: 280, "RIKEMAL AF-70" from Riken Vitamin Co., Ltd.)
B-2: Glycerin mono-12-hydroxystearate (hydroxyl value: 480, "RIKEMAL HC-100" from Riken Vitamin Co., Ltd.)
(C) Low-Hydroxyl-Value Ester
C-1: Diglycerin tetrabehenate (hydroxyl value: 30)
C-2: Pentaerythritol tetrastearate (hydroxyl value: 20)
C-3: Montanoic acid ester (hydroxyl value: 20 or Less, "LICOWAX E" from Clariant (Japan) K.K.)
C-4: Sorbitan tridocosanate (hydroxyl value: 80, "RIKEMAL B-150" from Riken Vitamin Co., Ltd.)
C-5: Low molecular weight polyethylene (hydroxyl value: 0, "SANWAX 161-P" from Sanyo Chemical Industries, Ltd.)

It is noted that the hydroxyl values of the glycerin fatty acid ester (B) and the polyhydric alcohol fatty acid ester (C) were measured in accordance with the Japan Oil Chemists' Society 2.3.6.2-1996 hydroxyl value (the pyridine-acetic anhydride method).

Examples 1 to 3, Comparative Examples 1 to 14

The materials described above were weighed according to the blend compositions as shown in Table 1 below, and then dry-blended. They were then melt-kneaded with a twin screw extruder (TEX-30, Japan Steel Works Ltd.) at a cylinder temperature of 260° C., a screw speed of 130 rpm, and an extrusion outlet of 12 kg/h. The discharged strand-shaped melt resin was cooled and cut with a pelletizer to obtain sample pellets of a resin composition. Subsequently, the above pellets were subjected to the following various evaluations.

Melt Viscosity Property (MV)

The prepared pellets of a resin composition were dried at 140° C. for 3 hours, and measurements were then performed in accordance with ISO11443 using a capirograph 1B (Toyo Seiki Seisaku-Sho Ltd.) at a furnace temperature of 260° C. and a shear rate of 1000 sec$^{-1}$ with a capillary φ1 mm×20 mmL. Measurement results are shown in Table 1.

Modulus of Elasticity when Bending

The prepared pellets of a resin composition were dried at 140° C. for 3 hours, and then inject-molded into a bending test piece at a molding temperature of 260° C. and a mold temperature of 80° C. Then, the modulus of elasticity when bending was evaluated based on the evaluation criteria specified in ISO178. "Good" denotes that the modulus of elasticity was 2400 MPa or more, and "Bad" denotes that the modulus of elasticity was less than 2400 MPa. Measurement results are shown in Table 1.

TABLE 1

| Components of resin composition [parts by mass] | | Example | | | Comparative Example | | | | | | | | | | | |
|---|---|---|---|---|---|---|---|---|---|---|---|---|---|---|---|---|
| | | 1 | 2 | 3 | 1 | 2 | 3 | 4 | 5 | 6 | 7 | 8 | 9 | 10 | 11 | 12 |
| (A) PBT resin | A-1 | 100 | 100 | 100 | 100 | 100 | 100 | 100 | 100 | 100 | 100 | 100 | 100 | 100 | 100 | 100 |
| (B) High-hydroxyl-value ester | B-1 | 0.3 | 0.3 | 0.3 | — | 0.3 | — | — | — | — | — | — | 0.3 | 0.3 | — | — |
| | B-2 | — | — | — | — | — | 0.3 | — | — | — | — | — | — | — | 0.3 | 0.3 |
| (C) Low-hydroxyl-value ester | C-1 | 0.3 | — | — | — | — | — | 0.3 | — | — | — | — | — | — | 0.3 | — |
| | C-2 | — | 0.3 | — | — | — | — | — | 0.3 | — | — | — | — | — | — | 0.3 |
| | C-3 | — | — | 0.3 | — | — | — | — | — | 0.3 | — | — | — | — | — | — |
| | C-4 | — | — | — | — | — | — | — | — | — | 0.3 | — | 0.3 | — | — | — |
| | C-5 | — | — | — | — | — | — | — | — | — | — | 0.3 | — | 0.3 | — | — |
| Melt viscosity MV (Pa · s) | | 193 | 198 | 210 | 236 | 221 | 191 | 236 | 244 | 245 | 248 | 247 | 227 | 222 | 180 | 185 |
| Modulus of elasticity | | ○ | ○ | ○ | ○ | ○ | X | ○ | ○ | ○ | ○ | ○ | ○ | ○ | X | X |

What is claimed is:

1. A polybutylene terephthalate resin composition, comprising:
   0.05 to 5 parts by mass of a glycerin fatty acid ester having a hydroxyl value of 200 or more to 400 or less;
   0.05 to 5 parts by mass of a polyhydric alcohol fatty acid ester having a hydroxyl value of 50 or less relative to 100 parts by mass of a polybutylene terephthalate resin;
   wherein the glycerin fatty acid ester comprises glycerin and/or a dehydration-condensation product thereof along with a fatty acid having 12 or more carbon atoms; and
   the polyhydric alcohol of the polyhydric alcohol fatty acid ester having a hydroxyl value of 50 or less is pentaerythritol, or erythritol.

2. The polybutylene terephthalate resin composition according to claim 1, wherein the polybutylene terephthalate resin has an intrinsic viscosity of 0.65 to 1.30 dl/g.

3. The polybutylene terephthalate resin composition according to claim 1, wherein the polybutylene terephthalate resin has a melt viscosity of 200 Pas or less as measured in accordance with ISO11443 at a furnace temperature of 260° C. and a shear rate of 1000 sec$^{-1}$ with a capillary φ1 mm×20 mmL.

\* \* \* \* \*